May 31, 1949. J. CHUDNER 2,471,934
ABRASIVE WHEEL
Filed Jan. 24, 1948
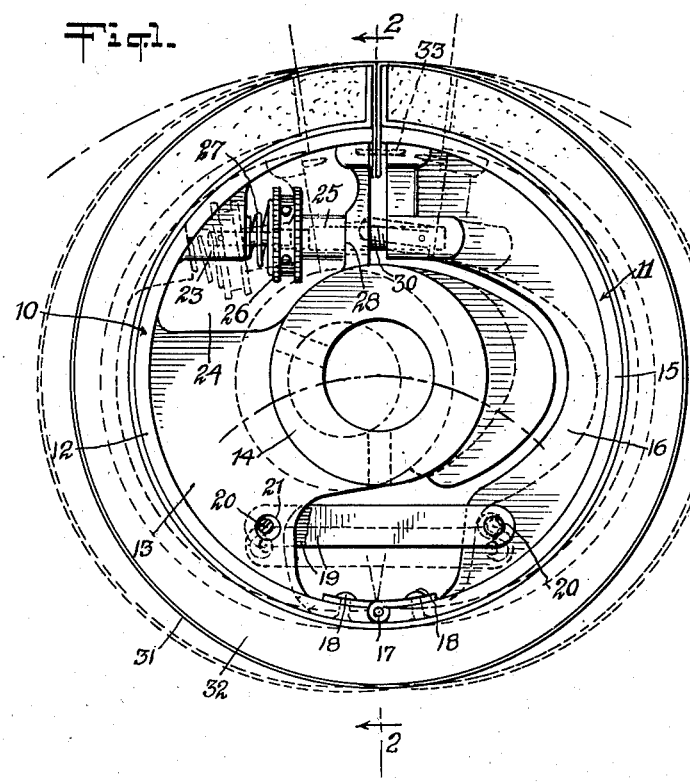
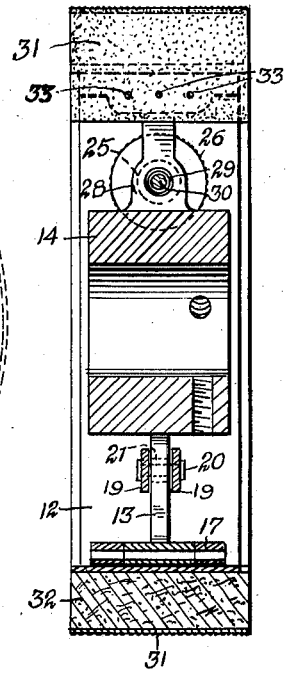
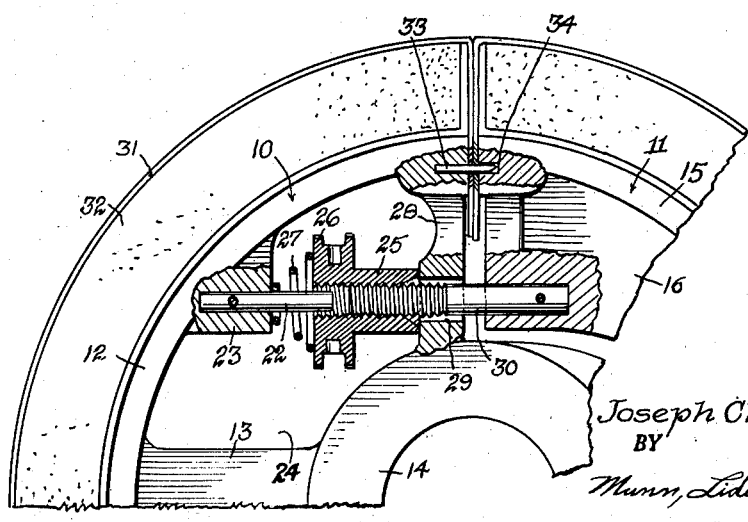
INVENTOR.
Joseph Chudner
BY
Munn, Liddy & Glaccum
Attorneys Patented May 31, 1949

2,471,934

UNITED STATES PATENT OFFICE 2,471,934

ABRASIVE WHEEL

Joseph Chudner, New York, N. Y.

Application January 24, 1948, Serial No. 4,137

4 Claims. (Cl. 51—194)

1

This invention relates to wheels having means whereby the working surfaces thereof may be replaced whenever necessary or desired.

More particularly, the invention relates to a wheel composed of mating sections connected for movement by manipulatable means into a split relation and a wheel forming relation, so that a strip of abrasive or other suitable material may be replaced for use when the wheel sections are in the split relation, and so that the working surface provided by said material will have a circular contour when the wheel sections are secured in their wheel forming relation.

The principal object of the present invention is the provision in a wheel of the indicated character of a more practical and reliable as well as a safer means for releasing, moving and securing the sections of the wheel for the stated purposes.

With the foregoing, other objects of the invention will appear when the following specification is read in connection with the accompanying drawing, in which Fig. 1 is a side view of a wheel embodying the features of the present invention, the sections of the wheel being shown secured in their closed relation in full lines and in their split relation in dotted lines, a portion being broken away and one part being shown in section.

Fig. 2 is a sectional view taken on the line 2—2 of Fig. 1.

Fig. 3 is an enlarged fragmentary side view of the wheel showing certain parts in section.

Shown in the drawing is a wheel comprising a pair of mating sections 10 and 11. The section 10 comprises a substantially semi-circular portion 12, web portion 13 and a hub 14 integral with each other. The section 11 comprises a substantially semi-circular portion 15 and a web portion 16 integral therewith. The sections 10 and 11 are connected by a hinge 17 whose leaves are secured to the portions 12 and 15, as at 18. The sections 10 and 11 are thus connected at the peripheral portions for pivotal opening movement away from each other into an open or split relation, as shown in dotted lines in Fig. 1, and for pivotal closing movement toward each other into a wheel forming relation, as shown in full lines in Fig. 1.

Means connects the sections 10 and 11 to limit the opening movement thereof. Said means consists of links 19 whose opposite ends are connected with the web portions 13 and 16 by pins 20. The portions 13 and 16 have holes 21 therein larger than the diameter of the pins 20 in order

2 to provide sufficient play to permit the pivotal movement of the sections 10 and 11.

In order to cause the pivotal movement of the sections 10 and 11 to draw them tightly into and also secure them in the closed wheel forming relation, and to release the sections and cause their pivotal opening movement to a certain extent for full opening movement to their split relation, there are provided means presently to be described. An arbor 22 is fixed at one end to a boss 23 on the portion 12 of the section 10. Said arbor 22 projects from the boss 23 tangentially with respect to the portion 12. The web portion 13 is cut away as at 24 to accommodate the arbor and a nut 25 having an enlarged knurled manipulating portion 26. The nut 25 is internally threaded throughout its length and is loosely arranged on the arbor 22 for rotational and axial movement. The nut 25 also may be cocked slightly with respect to the arbor 22. A helical compression spring 27 surrounds the arbor 22 with its opposite ends bearing on the boss 23 and the nut 25. The spring 27 constantly urges the nut 25 inwardly along the arbor 22. An abutment 28 formed from the portion 13 by reason of the cut away 24 limits the inward movement of the nut 25 and prevents the nut from becoming separated from the arbor 22. The abutment 28 has a hole 29 therein to freely accommodate a threaded pin 30 having one end fixed to the web portion 16 of the wheel section 11. The pin 30 projects from the portion 16 tangentially with respect to the portion 15. The pin 30 is so arranged that it may be disposed in axial alinement with the nut 25 as the sections 10 and 11 are brought toward each other for that purpose.

From the foregoing it will be understood that the nut 25 may be rotated in one direction while being urged axially inward against the abutment 28 by the spring 27 in threaded engagement with the pin 30. This will cause closing pivotal movement of the sections 10 and 11 as the nut 25 is rotated until they are secured in the wheel forming relation. Opposite rotation of the nut 25 causes opening pivotal movement of the sections 10 and 11 until the nut 25 has become separated from the pin 30 after which by grasping the sections 10 and 11 with both hands the sections may be brought to the full split relation.

A wheel having the features set forth above serves adequately for applying, removing and replacing a suitable working surface for various purposes such as carrying out abrading, grinding and other operations on work. As illustrated by way of example, the wheel may have applied thereto a replaceable strip of emery paper 31 as the working surface over a strip of felt 32 applied on the peripheral surface of the semicircular portions 12 and 15. These portions have secured thereto pointed pegs 33 for impaling the opposite end portions of the strip 31, there being holes 34 in the portions 12 and 15 to receive the pegs 33 when the sections 10 and 11 are in a closed relation. The strip 31 may be conveniently put in place impaled by the pegs 33 when the sections 10 and 11 are in the open or split relation. The strip 31 is evenly and tightly secured by closing the sections 10 and 11 in the manner described, thereby providing a substantially continuous circular abrasive surface. The hub 14 serves for mounting the wheel on a drive shaft for the purpose of imparting rotary movement to the wheel and its abrasive material.

I claim:

1. A wheel composed of a pair of mating sections hingedly connected at their peripheral portions, a fixed arbor and an abutment on one of said sections, a threaded pin fixed on the other one of said sections, and a rotatable and axially movable nut surrounding one end of the arbor for threaded engagement with the pin and also disengagement therefrom for the purpose of causing the closing pivotal movement of the sections toward each other into and securing them in a wheel forming relation by threaded engagement of the nut with the pin while engaged with said abutment or causing the opening pivotal movement of the sections away from each other into a split relation by unthreading and disengagement of the nut from the pin while engaged with said abutment.

2. A wheel as defined in claim 1, and a helical spring surrounding said arbor between the wheel section which carries the arbor and the nut to urge the nut for threaded engagement with the pin.

3. A wheel composed of a pair of mating sections hingedly connected at their peripheral portions, one of said sections having an opening therein and a fixed arbor thereon projecting into said opening, a fixed threaded pin on the other one of said sections, and a nut arranged in said opening rotatable and axially movable surrounding one end of the arbor for threaded engagement with the pin and also disengagement therefrom for the purpose of causing the closing pivotal movement of the sections toward each other into and securing them in a wheel forming relation by the threaded engagement of the nut with the pin while engaged with a wall of said opening, or causing the opening pivotal movement of the sections away from each other into a split relation by unthreading and disengagement of the nut from the pin while engaged with said wall.

4. A wheel as defined in claim 3 wherein said pin projects loosely through a portion of the wheel section having the arbor, and the nut has an enlarged manipulating portion, said portion engageable with said wall of said opening preventing the nut from becoming separated from the arbor.

JOSEPH CHUDNER.

REFERENCES CITED

The following references are of record in the file of this patent:

UNITED STATES PATENTS

| Number | Name | Date |
|---|---|---|
| 97,900 | Gale | Dec. 14, 1869 |
| 247,315 | Coy | Sept. 20, 1881 |
| 485,170 | Busfield | Nov. 1, 1892 |
| 555,719 | Winn | Mar. 3, 1896 |
| 613,079 | Ross | Oct. 25, 1898 |
| 917,068 | Hodskinson | Apr. 6, 1909 |
| 1,091,506 | Gouldbourn | Mar. 31, 1914 |
| 1,593,685 | Ashton | July 27, 1926 |
| 1,632,244 | Pearson | June 14, 1927 |
| 1,773,343 | Burns | Aug. 19, 1930 |
| 1,801,336 | Duplessis | Apr. 21, 1931 |